US012747609B1

(12) United States Patent
Al-Ahmadi

(10) Patent No.: US 12,747,609 B1
(45) Date of Patent: Sep. 29, 2026

(54) DEADBOLT LOCKING SYSTEM

(71) Applicant: Mohammad Al-Ahmadi, Marshall, TX (US)

(72) Inventor: Mohammad Al-Ahmadi, Marshall, TX (US)

( * ) Notice: Subject to any disclaimer, the term of this patent is extended or adjusted under 35 U.S.C. 154(b) by 49 days.

(21) Appl. No.: 18/909,724

(22) Filed: Oct. 8, 2024

Related U.S. Application Data

(63) Continuation of application No. 18/421,761, filed on Jan. 24, 2024, now abandoned.

(60) Provisional application No. 63/533,267, filed on Aug. 17, 2023.

(51) Int. Cl.
*E05B 15/02* (2006.01)

(52) U.S. Cl.
CPC ................................ *E05B 15/0205* (2013.01)

(58) Field of Classification Search
CPC ................................................... E05B 15/0205
USPC ............................ 292/2, 264, 288, 289, 296
See application file for complete search history.

(56) References Cited

U.S. PATENT DOCUMENTS

| | | | | | |
|---|---|---|---|---|---|
| 1,892,613 | A * | 12/1932 | Edgin | E05C 19/08 | 292/341.12 |
| 4,106,800 | A * | 8/1978 | Nakanishi | E05C 17/365 | 292/264 |
| 7,040,676 | B1 * | 5/2006 | Melfi | E05B 15/0205 | 292/340 |
| 7,226,094 | B2 * | 6/2007 | Swink | E05C 17/50 | 292/DIG. 19 |
| 7,918,116 | B2 * | 4/2011 | Quach | E05B 13/002 | 292/288 |
| 9,476,222 | B1 * | 10/2016 | Johnson | E05B 15/0205 | |
| 2016/0298361 | A1 * | 10/2016 | Dieguez | E05B 63/0052 | |

* cited by examiner

*Primary Examiner* — Nathan Cumar
(74) *Attorney, Agent, or Firm* — Richard Eldredge; Leavitt Eldredge Law Firm

(57) ABSTRACT

A deadbolt locking system includes a hinged blocking member with a striker plate configured to be affixed to a door frame and receive a deadbolt. The blocking member is hingedly connected to the striker plate and rotates into a blocking position to obstruct the rotation of a deadbolt's thumbturn, preventing unauthorized entry through methods such as lock picking or the use of duplicate keys.

5 Claims, 3 Drawing Sheets

DEADBOLT LOCKING SYSTEM

BACKGROUND

1. Field of the Invention

The present invention relates generally to door security systems, and more specifically to an apparatus for securing a deadbolt in a locked position.

2. Description of Related Art

Door locking devices systems are well known in the art and are effective means to secure doors against unauthorized access. For example, conventional deadbolt systems use a key-operated lock or a thumbturn to extend a bolt into a door frame, thereby securing the door in a closed position.

One of the problems commonly associated with conventional deadbolts is their vulnerability to unauthorized unlocking methods, such as lock picking or the use of duplicate keys. Once the deadbolt is defeated, other conventional door safety features can often be bypassed easily. Furthermore, many apartment complexes do not allow door lock modifications.

Accordingly, although great strides have been made in the area of door security devices, many shortcomings remain. It is therefore an object of the present invention to provide a deadbolt locking apparatus that substantially improves the ability of a deadbolt to ensure security of a door.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
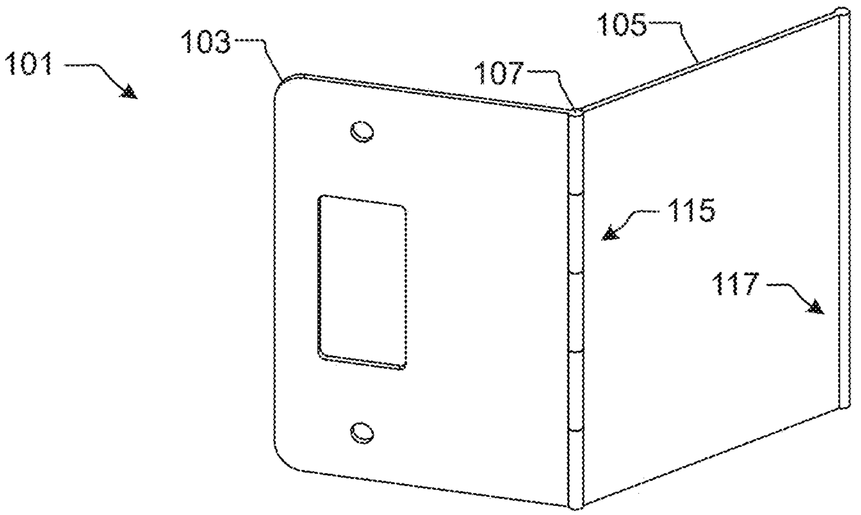
FIG. 1A is a front perspective view of a standard fit embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional deadbolt locking systems. Specifically, the system of the present invention employs a hinged blocking member integrated into a striker plate to obstruct the rotation of a deadbolt's thumbturn once it is in the locked position. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
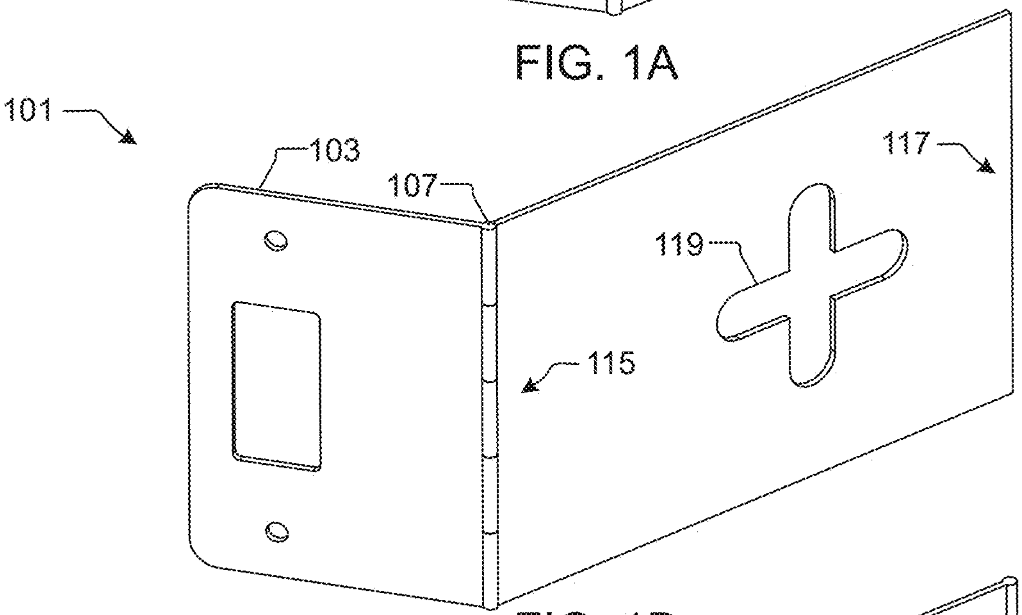
FIG. 1B is a front perspective view of a form-fitting embodiment of the present invention.
Figure 1C:
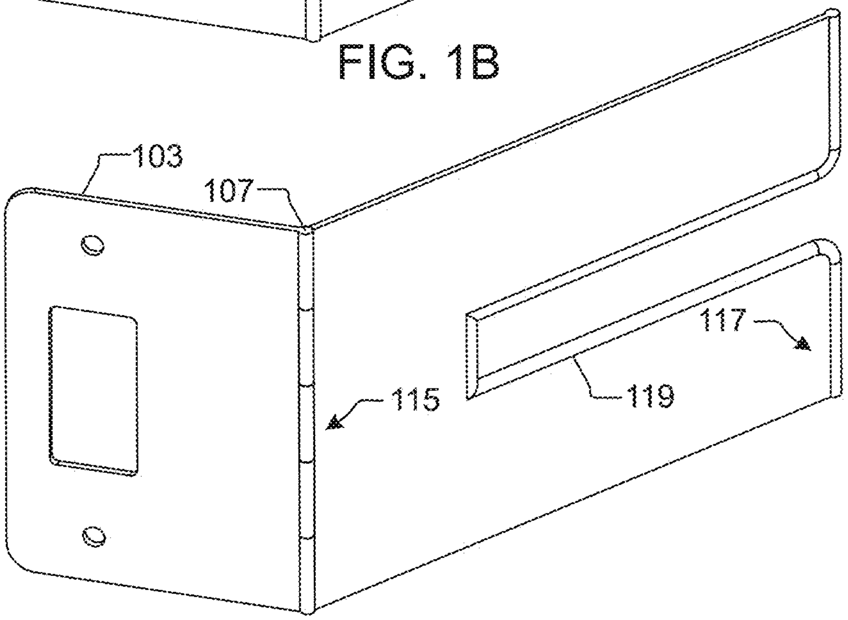
FIG. 1C is a front perspective view of a horizontal fit embodiment of the present invention.
Figure 2:
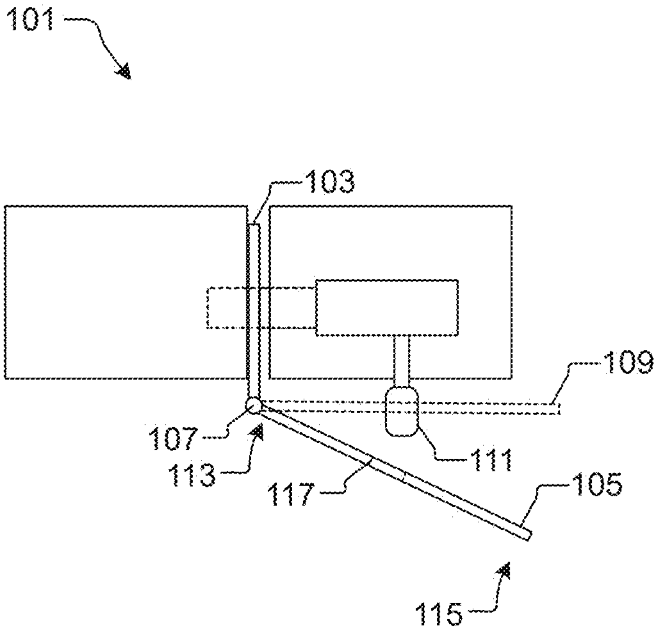
FIG. 2 is a plan view illustrating the deadbolt locking system in use.

Referring now to the drawings wherein like reference characters identify corresponding or similar elements throughout the several views, FIGS. 1-2 depict several views of a deadbolt locking system 101 in accordance with a preferred embodiment of the present application. It will be appreciated that system 101 overcomes one or more of the above-listed problems commonly associated with conventional deadbolt systems. In addition, it should be appreciated that more or fewer of such components may be included in different embodiments of the deadbolt locking system 101.

In the contemplated embodiment, system 101 includes a striker plate 103 and a blocking member 105. The striker plate 103 is configured to be affixed to a door frame of a door 100, replacing any previously installed striker plate 103 and similarly performing the function of receiving a deadbolt when the door 100 is in a closed position.

The blocking member 105 is hingedly connected to the striker plate 103 via a hinge 107 and is configured to rotate about the hinge 107 into a blocking position 109. In the blocking position 109, the blocking member 105 obstructs the rotation of a thumbturn 111 associated with the deadbolt. It is contemplated and will be appreciated that the blocking member 105 is specifically configured to impede the thumbturn 111 from rotating from a locked position to an unlocked position. The blocking member 105 can only be rotated into the blocking position 109 after the door 100 is closed and the deadbolt turned to the locked position, thereby defeating any attempts to unlock the deadbolt from the outside, including through the use of a key that would otherwise unlock the deadbolt.

The blocking member 105 itself extends between a proximal end 113 and a distal end 115, such that the hinge 107 is located at the proximal end 113 of the blocking member 105. In some embodiments, the blocking member 105 is dimensioned and shaped such that the distal end 115 is positioned adjacent to the thumbturn 111 of the deadbolt within its turning radius, thereby impeding the thumbturn 111 from rotating to unlock the deadbolt.

In some embodiments, the blocking member 105 may incorporate one or more thumbturn cutouts 117 traversing through the blocking member 105 between the proximal end 113 and the distal end 115. The thumbturn cutout 117 is specifically configured to constrain the thumbturn 111 against rotation when the blocking member 105 is in its blocking position 109. The thumbturn cutout 117 may vary in different embodiments to accommodate different shapes, sizes, orientations, and other aspects of different thumbturns. As the blocking member 105 is rotated into the blocking position 109, the thumbturn 111 of the deadbolt passes through and is surrounded by the thumbturn cutout 117, which thereby restrains its rotation.

Figure 3:
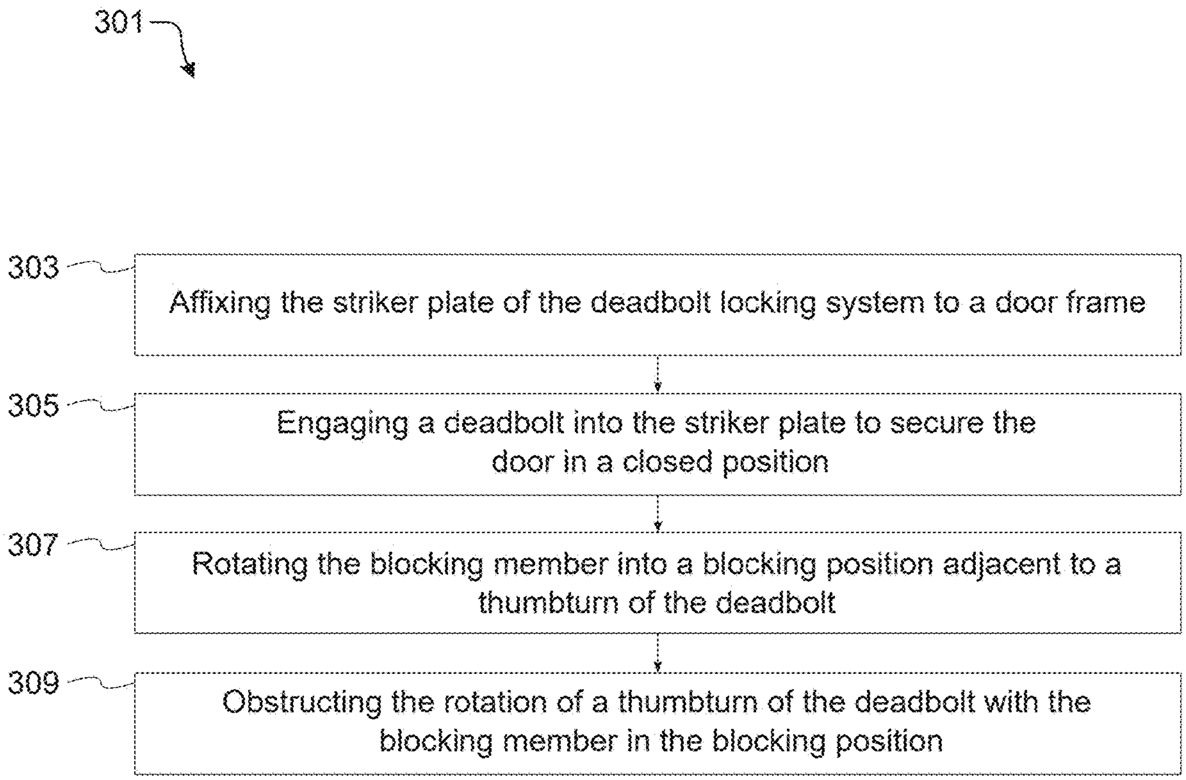
FIG. 3 is a methodology of use of the system of FIGS. 1-2.

FIG. 3 depicts a method of use 301 for the system of FIGS. 1-2 in accordance with an embodiment of the present invention. The method 301 initiates with step 303 of affixing the striker plate of the deadbolt locking system to a door frame, where the blocking member is rotatably connected to the striker plate by a hinge. Once the striker plate is secured, the method includes the subsequent step 305 of engaging the deadbolt into the striker plate to secure the door in a closed position.

The method 301 further includes a step 307 of rotating the blocking member into its blocking position adjacent to a thumbturn of the deadbolt. Once in this position, the blocking member obstructs 309 the thumbturn's rotation, thereby securing the deadbolt and enhancing the overall security of the door.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A deadbolt locking system comprising:

a striker plate configured to be affixed to a door frame of a door and to receive a deadbolt of the door when the door is in a closed position; and a blocking member hingedly connected to the striker plate via a hinge, configured to rotate about the hinge into a blocking position, wherein the blocking member is configured to obstruct a deadbolt thumbturn from rotating while in the blocking position;

wherein the blocking member, when the door is in the closed position, is configured to extend from the striker plate across a gap between the door frame and the door toward an interior side of the door, and wherein the blocking member comprises a thumbturn-receiving recess configured to at least partially receive a thumbturn of the deadbolt in the blocking position such that rotation of the thumbturn is prevented.

2. The deadbolt locking system of claim 1, wherein the blocking member is configured to obstruct the thumbturn from rotating from a locked position to an unlocked position by engagement of the thumbturn within the thumbturn-receiving recess.

3. The deadbolt locking system of claim 1, wherein the blocking member extends between a proximal end and a distal end, wherein the blocking member is hingedly connected to the striker plate at the proximal end and the distal end is configured to extend toward the thumbturn when the blocking member is in the blocking position.

4. The deadbolt locking system of claim 3, wherein the blocking member comprises a thumbturn cutout traversing therethrough between the proximal end and the distal end, wherein the thumbturn cutout is configured to constrain the thumbturn in the blocking position by receiving at least a portion of the thumbturn therein.

5. A method of securing a deadbolt, the method comprising the steps of:

providing the system of claim 1;

affixing the striker plate of the system to the door frame, the blocking member being rotatably connected to the striker plate by the hinge;

engaging the deadbolt into the striker plate to secure the door in the closed position;

rotating the blocking member into the blocking position;

obstructing the rotation of the thumbturn of the deadbolt with the blocking member in the blocking position;

positioning the blocking member across a gap between the door frame and the door and receiving at least a portion of the thumbturn within the thumbturn-receiving recess to thereby prevent rotation of the thumbturn.

* * * * *